May 8, 1928.  1,668,670
B. T. COATES
ADJUSTABLE HEADLIGHT FOR AUTOMOBILES
Filed Aug. 12, 1926
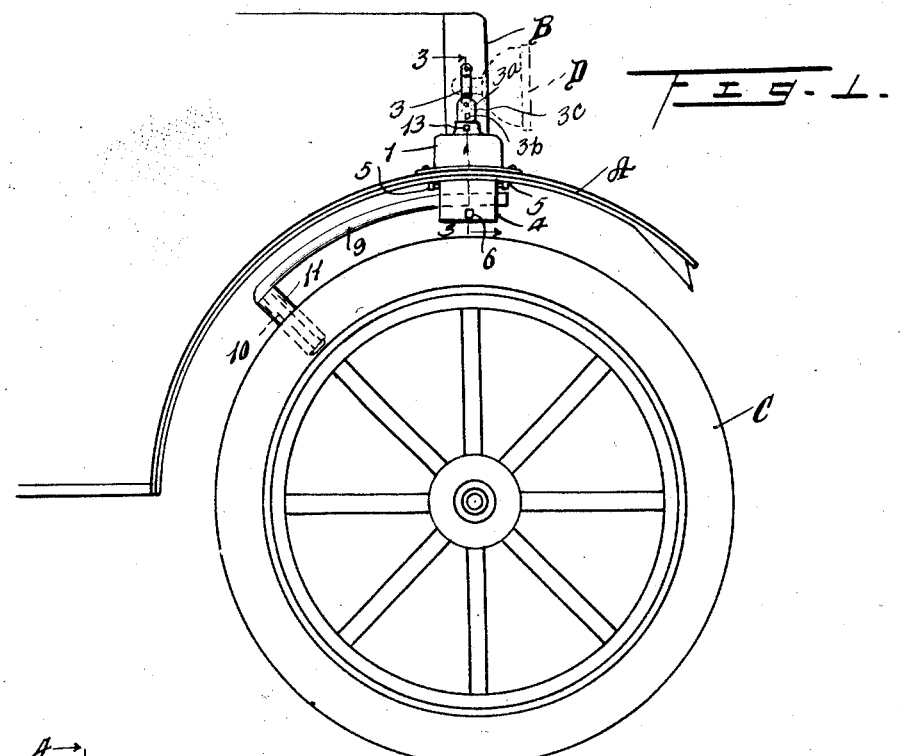
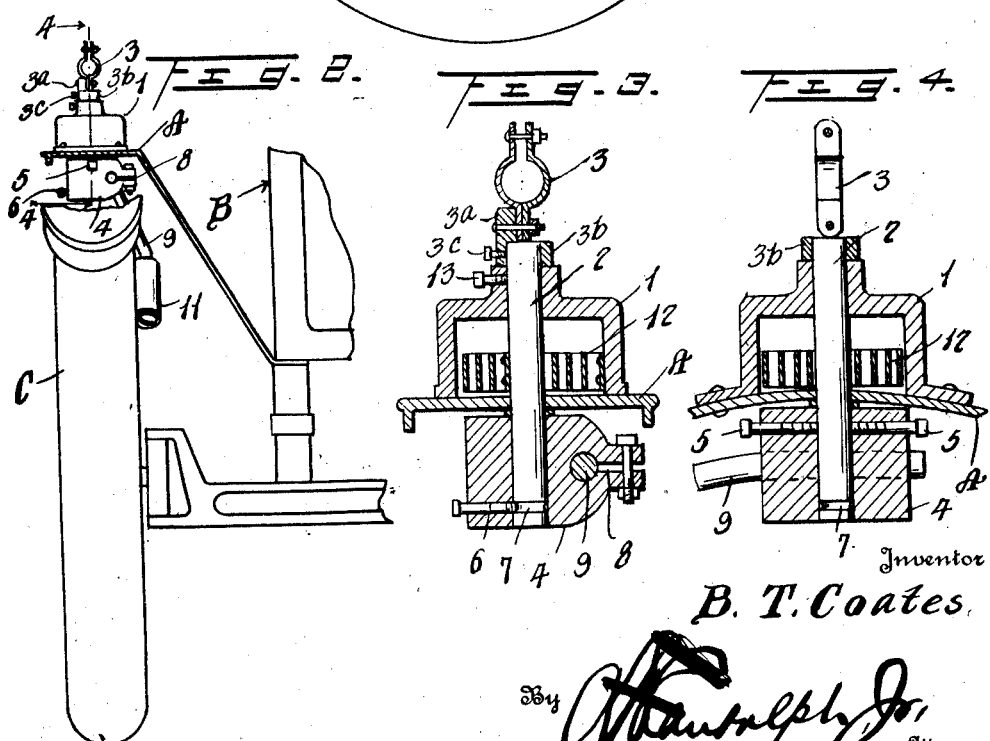
Inventor
B. T. Coates,
By [signature]
Attorney Patented May 8, 1928.

1,668,670

UNITED STATES PATENT OFFICE.

BENJAMIN T. COATES, OF CHICAGO, ILLINOIS.

ADJUSTABLE HEADLIGHT FOR AUTOMOBILES.

Application filed August 12, 1926. Serial No. 128,864.

The invention relates to a headlight for automobiles of the type known as a spot light or ditch light, and has for its object the provision of means for mounting the lamp casing for revolution on a front fender of the automobile, preferably the fender on the left side, and having an arm operatively secured to the lamp post and engageable by a front ground wheel to direct the rays of light from the lamp in front of the vehicle in whatever direction it may be turning, a spring being secured to the lamp post and to the casing in which it is journaled to hold the lamp post in opposition to the movement of the arm.

The invention will be described in detail hereinafter and will be found illustrated in the accompanying drawings in which Figure 1 is a side view of a front fragment of an automobile showing the adjustable headlight in position, Figure 2, a front view partly broken away and in section, Figure 3, a vertical sectional view on a plane indicated by the line 3—3 of Figure 1, and Figure 4, a similar view on a plane indicated by the line 4—4 of Figure 2.

In the drawing similar reference characters will be used to designate corresponding parts throughout the several views.

The adjustable headlight is shown in Figures 1 and 2 mounted on a fender A of an automobile designated generally B, and having a front ground wheel C. Secured to the upper side of the fender A is a casing 1, and 2 designates a lamp post mounted for rotation in the casing 1 and in an opening in the fender A. 3 indicates a clamping member to engage a lamp D secured to the upstanding lug 3ª of a collar 3ᵇ engaging lamp post 2 and held for rotation therewith by means of a set screw 3ᶜ. Secured to the lower end of the lamp post 2 is a block 4 that is held in fixed relation therewith by means of set bolts 5, a bolt 6 being also provided in the block and engaging a circumferential groove 7 near the lower end of the lamp post to hold the block 4 from withdrawal from the post. Block 4 is formed with a clamping member 8 that engages an arm 9 extending rearwardly from the block and curved downwardly, and provided with a downwardly inclined end 10 on which is journaled a roller 11 adapted to engage the inner side of the tire of the wheel C. This structure provides for turning the lamp post 2 and lamp D in the direction the automobile may be turning. A helical spring 12 is secured at one of its ends to the post 2, and has its other end secured to a wall of the casing 1, said spring tending to rotate the post 2 in opposition to the direction given by contact of the roller 11 with the wheel tire, so that the lamp B will be always pointed in the direction in which the vehicle may be moving to throw the rays of light from the lamp in front of the vehicle at all times. In order that the downturned end 10 and the roller 11 shall not interfere with changing the tire on the wheel C, I provide a set screw 13 engaging the casing 1 to hold the lamp post 2 in a fixed position to hold the roller 11 from engagement with the tire temporarily.

What is claimed is:—

An adjustable headlight for vehicles, comprising a casing mounted on a wheel fender, a lamp post journaled in said casing and in the fender and adapted to have a lamp secured thereto, an arm operatively secured to the lamp post and having a downwardly inclined end, a roller journaled on said downwardly inclined end and engaging a front ground wheel, and resilient means engaging the lamp post and casing and operating in opposition to the arm.

In testimony whereof I affix my signature.

BENJAMIN T. COATES.